(12) United States Patent
Baek et al.

(10) Patent No.: US 10,922,793 B2
(45) Date of Patent: Feb. 16, 2021

(54) GUIDED HALLUCINATION FOR MISSING IMAGE CONTENT USING A NEURAL NETWORK

(71) Applicant: NVIDIA Corporation, Santa Clara, CA (US)

(72) Inventors: Seung-Hwan Baek, Seoul (KR); Kihwan Kim, Campbell, CA (US); Jinwei Gu, San Jose, CA (US); Orazio Gallo, Santa Cruz, CA (US); Alejandro Jose Troccoli, San Jose, CA (US); Ming-Yu Liu, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 83 days.

(21) Appl. No.: 16/353,195

(22) Filed: Mar. 14, 2019

(65) Prior Publication Data
US 2019/0355103 A1      Nov. 21, 2019

Related U.S. Application Data

(60) Provisional application No. 62/672,499, filed on May 16, 2018.

(51) Int. Cl.
*G06T 5/00*   (2006.01)
*G06K 9/72*   (2006.01)
(Continued)

(52) U.S. Cl.
CPC ............ *G06T 5/005* (2013.01); *G06K 9/6256* (2013.01); *G06K 9/726* (2013.01); *G06T 3/4046* (2013.01);
(Continued)

(58) Field of Classification Search
CPC ......... G06T 3/4046; G06T 5/005; G06T 5/50; G06T 2207/10016; G06T 2207/20081;
(Continued)

(56) References Cited

U.S. PATENT DOCUMENTS 9,760,978 B1 * 9/2017 Lu ............................. G06N 3/08
10,699,453 B2 * 6/2020 Jin ........................... G06T 5/005
(Continued)

OTHER PUBLICATIONS

Demir et al. "Patch-based image inpainting with generative adversarial networks." arXiv preprint arXiv:1803.07422 (Mar. 2018). (Year: 2018).*

(Continued)

*Primary Examiner* — Katrina R Fujita
(74) *Attorney, Agent, or Firm* — Leydig, Voit & Mayer, Ltd.

(57) ABSTRACT

Missing image content is generated using a neural network. In an embodiment, a high resolution image and associated high resolution semantic label map are generated from a low resolution image and associated low resolution semantic label map. The input image/map pair (low resolution image and associated low resolution semantic label map) lacks detail and is therefore missing content. Rather than simply enhancing the input image/map pair, data missing in the input image/map pair is improvised or hallucinated by a neural network, creating plausible content while maintaining spatio-temporal consistency. Missing content is hallucinated to generate a detailed zoomed in portion of an image. Missing content is hallucinated to generate different variations of an image, such as different seasons or weather conditions for a driving video.

31 Claims, 13 Drawing Sheets

(51) Int. Cl.
   *G06T 5/50* (2006.01)
   *G06K 9/62* (2006.01)
   *G06T 3/40* (2006.01)

(52) U.S. Cl.
   CPC ...... *G06T 5/50* (2013.01); *G06T 2207/10016* (2013.01); *G06T 2207/20081* (2013.01); *G06T 2207/20084* (2013.01)

(58) Field of Classification Search
   CPC ........ G06T 2207/20084; G06N 3/0454; G06N 3/0472; G06N 3/088; G06K 9/6256; G06K 9/726
   See application file for complete search history.

(56) References Cited

U.S. PATENT DOCUMENTS

2012/0045095 A1\* 2/2012 Tate .......................... G06T 7/75
382/103
2018/0012330 A1\* 1/2018 Holzer ................. H04N 13/111
2018/0165798 A1\* 6/2018 Lin ....................... G06K 9/6267
2018/0286023 A1\* 10/2018 Zhu .......................... G06T 7/11

OTHER PUBLICATIONS

Yang et al. "High-resolution image inpainting using multi-scale neural patch synthesis." Proceedings of the IEEE Conference on Computer Vision and Pattern Recognition. 2017. (Year: 2017).\*
Yeh et al. "Semantic image inpainting with deep generative models." Proceedings of the IEEE conference on computer vision and pattern recognition. 2017. (Year: 2017).\*
Isola, P., et al., "Image-to-Image translation with conditional adversarial networks," arXiv (2016).
Wang, T.C., et al., "High-resolution image synthesis and semantic manipulation with conditional gans," arXiv preprint arXiv:1711. 11585 (2017).
Geiger, A., et al., "Are we ready for autonomous driving? The kitti vision benchmark suite," IEEE Conference on Computer Vision and Pattern Recognition (CVPR) (2012) 3354-3361.

\* cited by examiner

US 10,922,793 B2

GUIDED HALLUCINATION FOR MISSING IMAGE CONTENT USING A NEURAL NETWORK

CLAIM OF PRIORITY

This application claims the benefit of U.S. Provisional Application No. 62/672,499 titled "GENERATION AND APPLICATION OF SEQUENCES OF INFINITE IMAGES USING GENERATIVE ADVERSARIAL NETWORKS," filed May 16, 2018, the entire contents of which is incorporated herein by reference.

TECHNICAL FIELD

The present disclosure relates to image generation, and, more specifically, to generating missing image content using a neural network.

BACKGROUND

A particular type of image content generation is used to manually create images that, when viewed in sequence, exhibit a particular special effect. A sequence of images where each image recursively appears within itself is the "Droste effect." In other words, a smaller version of the image is present in an original image, so that, as a camera zooms into the original image, the smaller version becomes a copy of the original image, repeatedly. Such a sequence of images is manually generated because the limited resolution of the original image does not provide the data needed to automatically generate a progressively higher resolution version of the smaller image, as the camera zooms in, until the higher resolution version of the smaller image becomes the copy of the original image. Generating the image sequences manually is slow and requires skilled artists. There is a need for addressing these issues and/or other issues associated with the prior art.

SUMMARY

Missing image content is generated using a neural network. In an embodiment, a complete image and associated complete semantic label map are generated from an incomplete image and associated incomplete semantic label map. The incomplete image/semantic map pair is missing data compared with the complete image/semantic map pair. In an embodiment, the input image/map pair is a low resolution image and associated low resolution semantic label map, lacking detail and therefore missing data or content. Rather than simply enhancing the incomplete image/map pair (e.g., upsampling), the missing data is improvised or hallucinated by a neural network, creating plausible content while maintaining spatio-temporal consistency. In an embodiment, the missing data is hallucinated to generate a detailed zoomed in portion of an image. In an embodiment, the missing data is hallucinated to generate different variations of an image, such as different seasons or weather conditions for a driving video.

A method, computer readable medium, and system are disclosed for receiving, by a neural network model, a first image missing a portion of image data and a first semantic map corresponding to the first image and missing a portion of semantic data. The neural network model processes the first image and the first semantic map to produce a second image including hallucinated image data representing a complete version of the first image.

DETAILED DESCRIPTION

Conventional image generation to produce an endless zoom, such as the Droste effect, requires very high resolution images to continuously zoom in on an image. In reality, zooming by applying a high magnification ratio to a single image of high, but limited, resolution cannot produce high resolution zoomed images. Therefore, the zooming problem can be considered to be a hallucination problem with minimal semantic information available from which to improvise or hallucinate the missing image data (e.g., resolution). A neural network may learn to generate the missing data for an incomplete input image based on the incomplete input image and semantic information corresponding to the incomplete input image. In an embodiment, a generative adversarial network (GAN) is used to train the neural network to create missing data for incomplete input images.

Figure 1A:
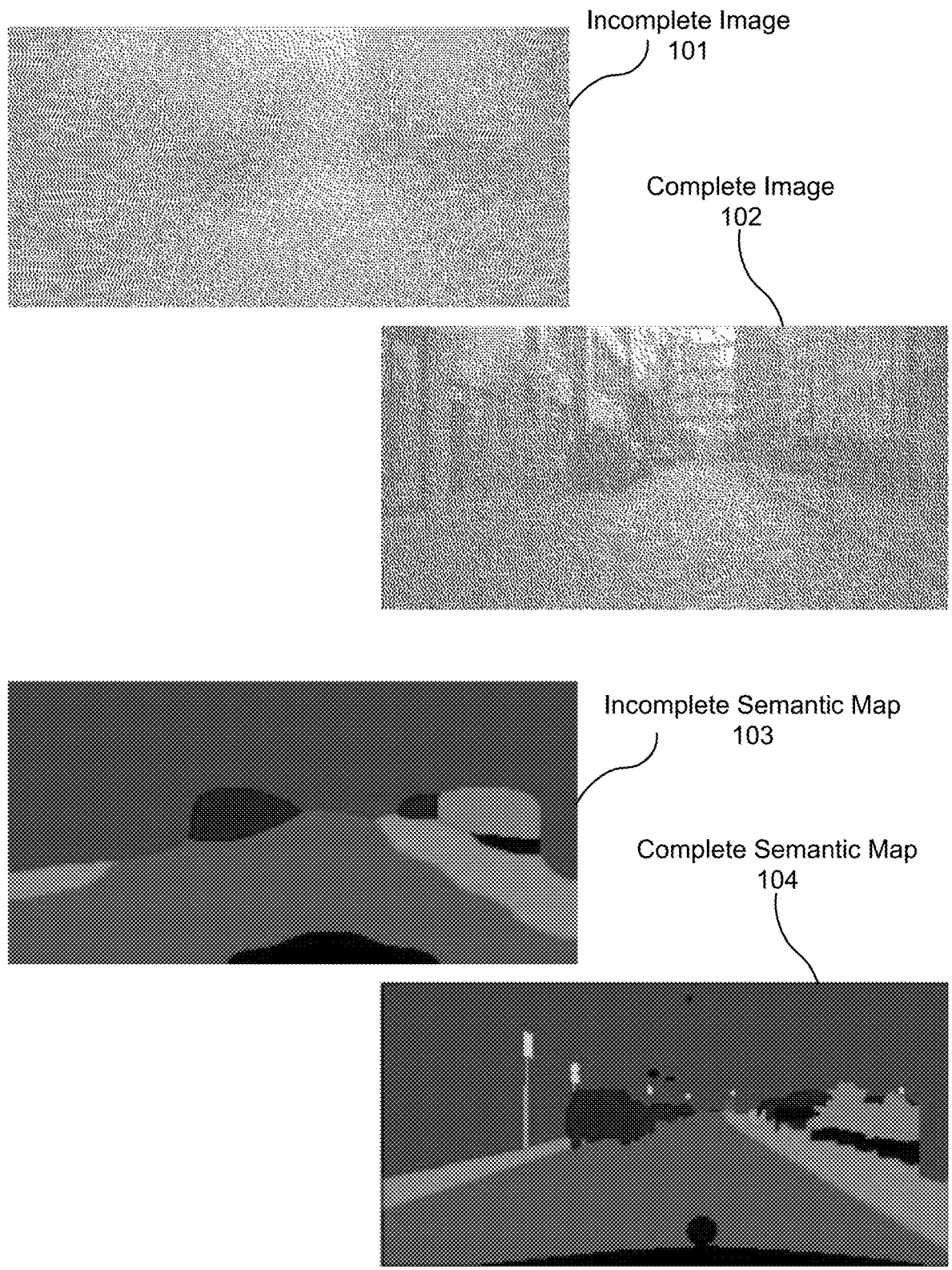
FIG. 1A illustrates a conceptual diagram of a low resolution image and low resolution semantic map and a corresponding hallucinated high resolution image and high resolution semantic map, in accordance with an embodiment.

FIG. 1A illustrates a conceptual diagram of an incomplete image 101 and incomplete semantic map 103 and a corresponding complete image 102 and complete semantic map 104, in accordance with an embodiment. The incomplete image 101 and incomplete semantic map 103 are each missing data or some data is hardly visible due to limited pixel resolution. The incomplete image 101 is a low quality image represented by color image data for each pixel (shown as a stippled greyscale image instead of an RGB color image). In an embodiment, the incomplete image 101 is a low resolution image. The complete image 102 is a hallucinated high resolution image represented by color image data for each pixel (shown as a stippled greyscale image instead of an RGB color image), where the pixel resolution of the complete image 102 is greater compared with the pixel resolution of the incomplete image 101.

The incomplete semantic map 103 is a low quality semantic map represented by color data for each pixel (shown as a greyscale image instead of an RGB color image), where each color defines a label representing a different object, object instance, and/or object class. In an embodiment, the incomplete semantic map 103 is a low resolution semantic map. In an embodiment, the incomplete image 101 comprises sparse data, corrupt data, and/or noisy data. The complete semantic map 104 is a hallucinated high resolution semantic map represented by color data for each pixel (shown as a greyscale image instead of an RGB color image), where the pixel resolution of the complete semantic map 104 is greater compared with the pixel resolution the incomplete semantic map 103.

Importantly, to produce plausible, accurate, and/or realistic hallucinated image data, the hallucinated image data should maintain context (e.g., colors, shapes, etc.) that is consistent with the incomplete input image(s). Using semantic maps, even incomplete semantic maps to produce the hallucinated image data may ensure that the context is consistent. Additionally, the hallucinated image data should be temporally consistent with the incomplete image data. Providing a sequence of incomplete images to the neural network model rather than a single incomplete image may improve temporal consistency. A GAN may be used in training a neural network model to ensure the neural network model produces plausible content.

Figure 1B:
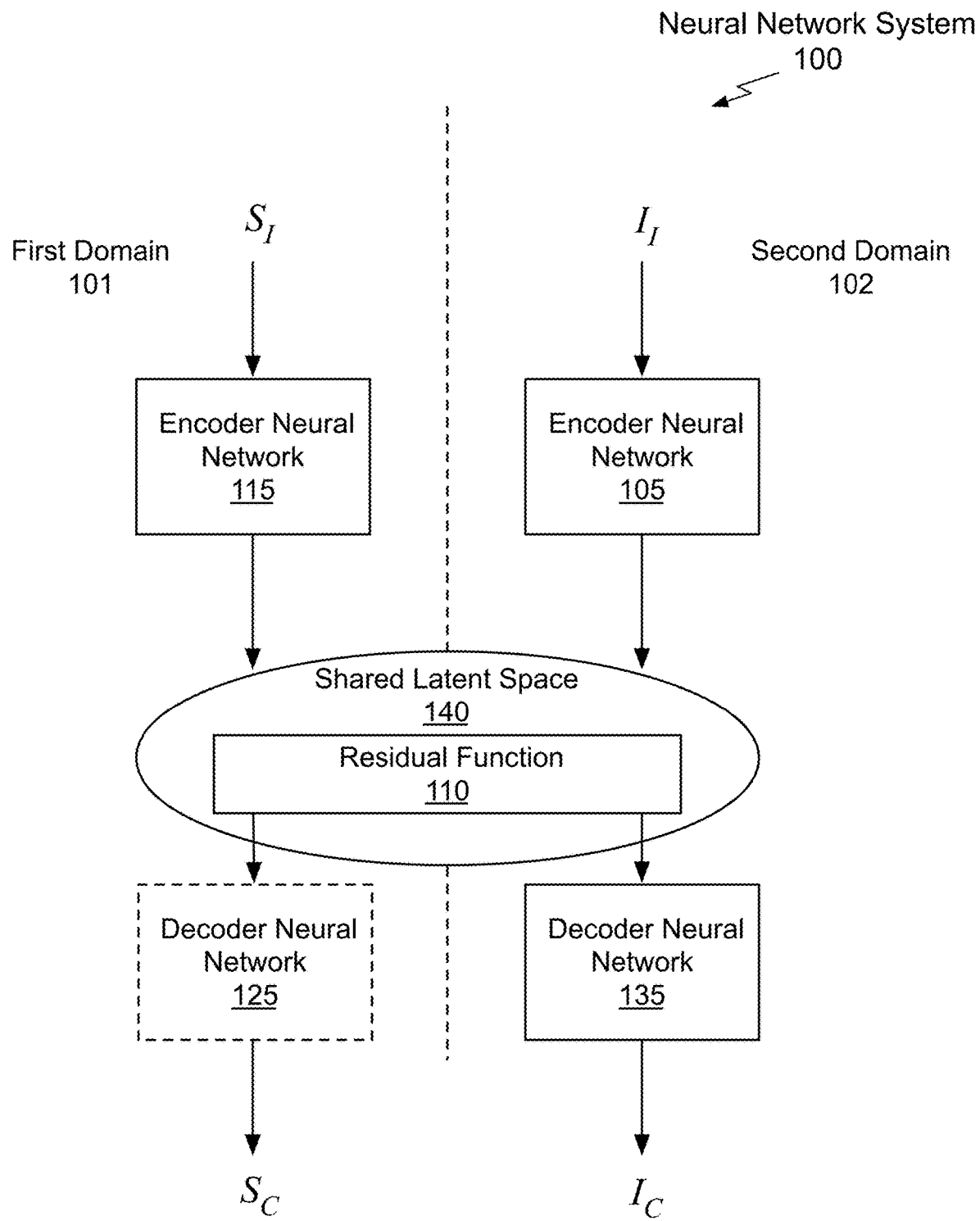
FIG. 1B illustrates a block diagram of a neural network system for hallucinating missing content for images and semantic label maps, in accordance with an embodiment.

FIG. 1B illustrates a block diagram of a neural network system 100 for hallucinating missing content for images and semantic label maps, in accordance with an embodiment. The neural network system 100 is a neural network model including two encoder neural networks 115 and 105, a residual function 110, and two decoder neural networks 125 and 135. The encoder neural network 115 processes the incomplete semantic map $S_I$ and the encoder neural network 105 processes the corresponding incomplete image $I_I$. In an embodiment, the decoder neural network 125 is omitted and the neural network system 100 outputs complete images $I_C$ without outputting complete semantic maps $S_C$.

The encoder neural network 115 processes the incomplete semantic map $S_I$ according to layer parameters (e.g., weights) that are determined during training. The encoder neural network 105 processes the incomplete image $I_I$ according to the layer parameters that are determined during training. Features output by the encoder neural networks 105 and 115 are concatenated and processed by the residual function 110 according to the layer parameters determined during training. The two decoder neural networks 125 and 135 also process data output by the residual function 110 according to the layer parameters determined during training to produce the complete image $I_C$ and complete semantic map $S_C$. In an embodiment, the incomplete image is a low resolution image, the incomplete semantic map is a low resolution semantic map, the complete image is a high resolution image. The complete image includes hallucinated image data representing a complete (e.g., high resolution) version of the incomplete image. Similarly, the complete semantic map includes hallucinated semantic data representing a complete (e.g., high resolution) version of the semantic map for the complete image.

Although the neural network system 100 is described in the context of processing units, one or more of the units, encoder neural networks 105 and 115, decoder neural networks 125 and 135, and residual function 110 may be implemented as a program, custom circuitry, or by a combination of custom circuitry and a program. For example, the encoder neural networks 105 and/or 115 may be implemented by a GPU (graphics processing unit), CPU (central processing unit), or any processor capable of implementing layers of a neural network. Furthermore, persons of ordinary skill in the art will understand that any system that performs the operations of the neural network system 100 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

The hallucination task may be modeled assuming an incomplete image $I_I$ for which the neural network system 100 learns a function F that can map $I_I$ into a corresponding complete image $I_C$. When the incomplete image and semantic map are low resolution the corresponding complete image is a high resolution image. Conventional super-resolution algorithms cannot handle generating high resolution images where the resolution difference between $I_I$ and $I_C$ is 20× or more. However, in contrast with conventional super-resolution algorithms, the neural network system 100 may hallucinate the high-resolution output image $I_C$. Furthermore, when a low resolution semantic map $S_I$ (or semantic segmentation mask) for $I_I$ is available, in addition to hallucinating the high-resolution output image $I_C$, the neural network system 100 may also hallucinate a high-resolution segmentation map. In an embodiment, the low-resolution semantic map $S_I$ may be replaced with a high-resolution semantic map. When a corresponding semantic map is available, the neural network system 100 may learn the mapping as: $I_C$, $S_C$=F($I_I$, $S_I$), where $S_I$ and $S_C$ are the low resolution and high resolution semantic maps, respectively.

Considering the hallucination task as an image translation problem, a key challenge, is to learn a joint distribution of input data in different domains, namely the image domain and the semantic map domain. It is assumed that an incomplete input pair ($I_I$, $S_I$) can be mapped to a same latent code z in the shared latent space 140. Semantic map data is a first domain 101 and image data is a second domain 102. $E_1$ and $E_2$ are two encoding functions, mapping incomplete images and semantic maps, respectively, to latent codes in the shared latent space 140. The encoder neural network 115 and the encoder neural network 105 perform the encoding functions $E_1$ and $E_2$, respectively. $G_1$ and $G_2$ are two decoder functions, mapping the latent codes to the complete images ($I_C$) in the first domain 101 and complete sematic maps ($S_C$) in the second domain 102, respectively. The decoder neural network 125 and the decoder neural network 135 perform the decoding functions $G_1$ and $G_2$, respectively. The neural network system 100 may be trained in a supervised (using ground truth training data) and/or unsupervised manner (using conditional discriminators).

A shared residual function R processes the latent codes in the shared-latent space. In an embodiment, the residual function 110 is implemented as a neural network. In an embodiment, a first portion of the neural network implementing the residual function 110 is initially trained on incomplete images and semantic maps before a second portion of the neural network is combined with the first potion. The combination of the first and second portions of the neural network is then trained on complete images before being integrated into the neural network system 100. In an embodiment, the first portion is a coarse global generator network and the second portion is a fine local enhancer network. In an embodiment, the first portion comprises a convolutional front-end, a set of residual blocks, and a transposed convolutional back-end. The first portion may receive an input of 1024×512 resolution and output data of equal resolution. In an embodiment, the second portion comprises a convolutional front-end, a set of residual blocks, and a transposed convolutional back-end. The second portion may receive an input of 2048×1024 resolution and output data of equal resolution. An input to the set of residual blocks within the second portion is an element-wise sum of two feature maps, namely an output feature map generated by the convolutional front-end of the second portion and a last feature map generated by the transposed convolutional back-end of the first portion of the neural network. In an embodiment, the first portion is inserted within the second portion, after the convolutional front-end and before the set of residual blocks. In an embodiment, an input to the first portion is downsampled 2× and provided as the input to the first portion.

In addition to, or instead of, generating high resolution images from low resolution images, the neural network system 100 may also be configured to hallucinate image content for portions of the incomplete input image for which no image data is available. For example, when a camera is panning, portions of the scene that are outside of a field-of-view associated with a first image frame are not captured in the first image frame. The portions of the scene missing in the first image frame are captured in a later image frame. In an embodiment, the neural network model generates the image content missing in the first image frame to hallucinate a complete later image frame in a sequence. In another example, a portion of a scene may be missing because it is obscured by an object and the portion of the scene may be hallucinated to produce a complete image.

Finally, the neural network model may hallucinate image content to produce a variety of complete images for a single input image or for each image frame in a sequence of incomplete images. In sum, the neural network system 100 may be configured to hallucinate an infinite number of complete images from one or more incomplete images and corresponding incomplete semantic maps. The infinite image technique may be used to generate high resolution zoomed in images (uberzoom), missing content due to camera motion (ubertranslation), and/or infinite content creation (variations of an input image).

Recursive generation and recursive zoom are "infinite image generation" processes for hallucinating or creating a sequence of images from one or more $(I_I, S_I)$ pairs to produce a sequence of complete images having the Droste effect. A first portion of a high resolution image is extracted to generate a low resolution image for the first portion that, when processed by the neural network system 100 produces a high resolution image corresponding to the first portion. A second portion of a high resolution semantic map, corresponding to the first portion of the high resolution image, is extracted to generate a low resolution semantic map for the second portion that, when processed by the neural network system 100 produces a high resolution image corresponding to the second portion.

In an embodiment, recursive generation zooms into a region of a high resolution output pair $(I_C, S_C)$, extracts the region by cropping the region, upsamples the cropped region, thereby generating an input pair $(I_I, S_I)$ that is blurred. The blurred input pair $(I_I, S_I)$ is input to the neural network system 100 to hallucinate another high resolution output pair. The process may be repeated to recursively generate a variety of high resolution output pairs. Recursive zoom can be utilized to automatically synthesize the Droste Effect, among other applications such as those used in virtual reality environments. In particular, driving image sequences may be generated from a single image (or multiple images) to augment existing road scene datasets.

Figure 1C:
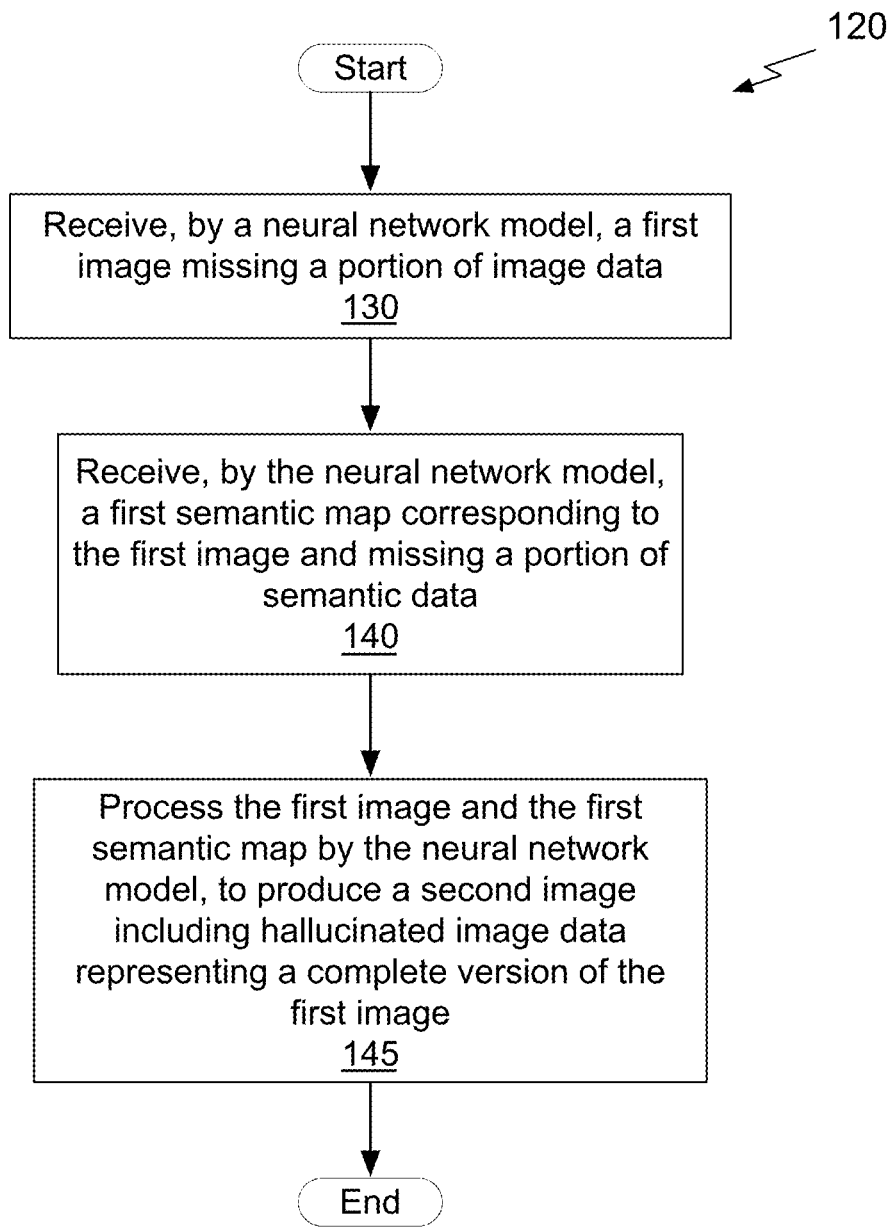
FIG. 1C illustrates a flowchart of a method for hallucinating complete images, in accordance with an embodiment.

FIG. 1C illustrates a flowchart of a method 120 for hallucinating high resolution images, in accordance with an embodiment. Although method 120 is described in the context of a processing unit, the method 120 may also be performed by a program, custom circuitry, or by a combination of custom circuitry and a program. For example, the method 120 may be executed by a GPU (graphics processing unit), CPU (central processing unit), or any processor capable of implementing a neural network model, such as the neural network system 100. Furthermore, persons of ordinary skill in the art will understand that any system that performs method 120 is within the scope and spirit of embodiments of the present disclosure.

At step 130, the neural network model receives a first image missing a portion of image data. At step 140, the neural network model receives a first semantic map corresponding to the first image and missing a portion of semantic data. In an embodiment, the first image is a low resolution image and the first semantic map is a low resolution semantic map. The first semantic map is used by the neural network model to constrain and guide the hallucination of image content output images to generate the missing portion of image data that is plausible and contextually consistent.

At step 145, the neural network model processes the first image and the first semantic map to produce a second image including hallucinated image data representing a complete version of the first image. In an embodiment, the first image is a low resolution image produced by cropping and upsampling a specific region of a high resolution image. It is not practical to zoom the specific region of the high resolution image which has limited resolution and may not contain sufficient information to be restored in a high resolution using conventional techniques, such as upsampling using bilinear interpolation, when the zoom is 15× or greater. Therefore, the missing portion of the first image cannot be reliably generated using conventional super-resolution techniques. In an embodiment, the neural network model hallucinates a higher resolution image of the specific region so that artificial zooming into the specific region of the high resolution image offers higher resolution compared with the first image.

In an embodiment, the first image is an incomplete image where a portion (i.e., 20% of the right portion) of the image is blank because the camera translated. In an embodiment, the neural network model hallucinates image content for the blank portion of the first image to produce the second image that is a complete version of the first image.

Figure 1D:
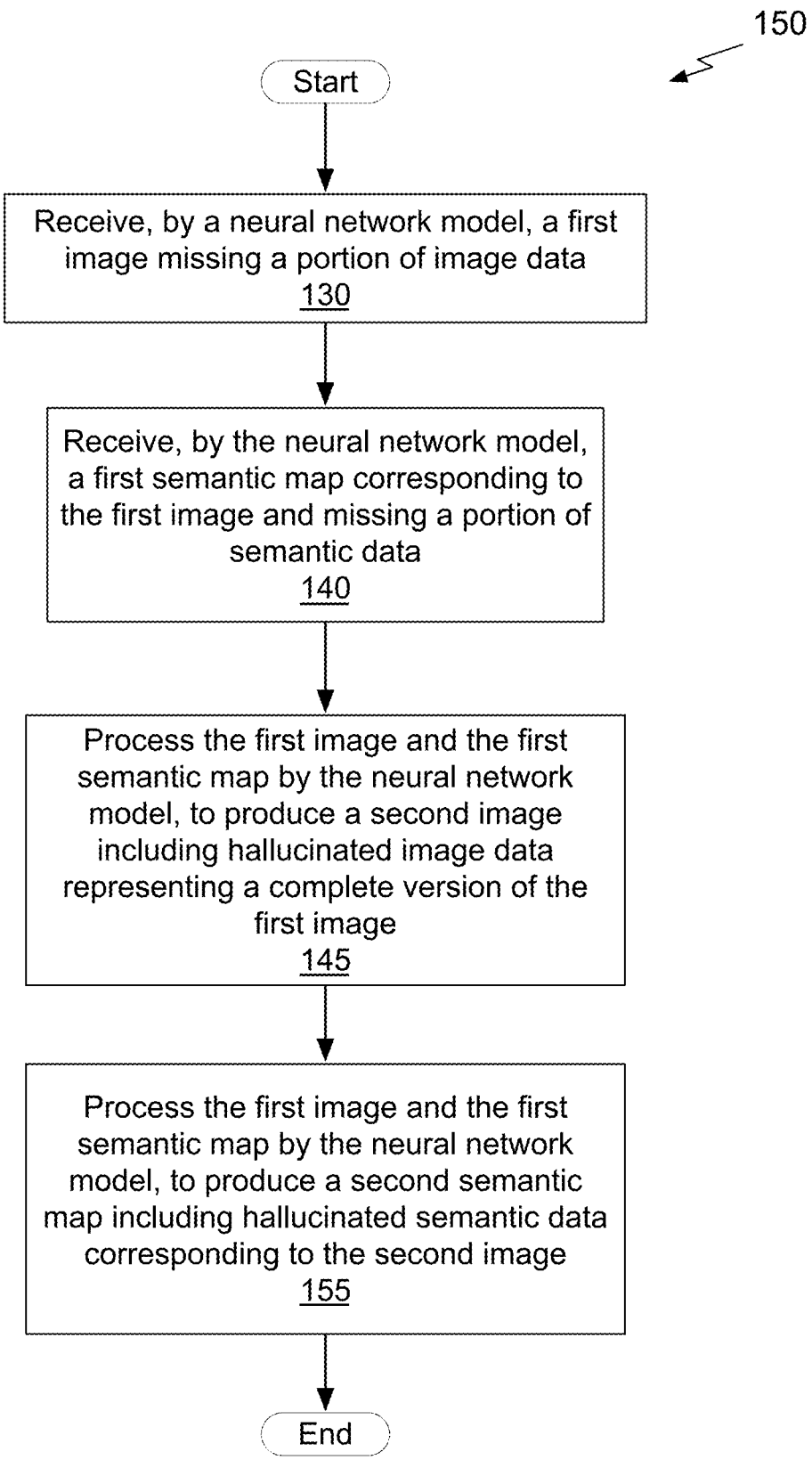
FIG. 1D illustrates a flowchart of a method for hallucinating complete images and semantic label maps, in accordance with an embodiment.

FIG. 1D illustrates a flowchart of a method 150 for hallucinating high resolution images and semantic label maps, in accordance with an embodiment. Steps 130, 140, and 145 are completed as previously described in conjunction with FIG. 1C. At step 155, the neural network model processes the first image and the first semantic map to produce a second semantic map including hallucinated semantic data corresponding to the second image. In an embodiment, the neural network model hallucinates a high resolution semantic map for the second image, where the second image is a high resolution zoomed in region of a high resolution image. In an embodiment, the neural network model hallucinates semantic content for the blank portion of the first image to produce the second semantic map.

Given an incomplete image $I_I$, a function F is learned by the neural network system 100 that can map $I_I$ into a corresponding complete image $I_C$. The mapping is:

$$I_C, S_C = F(I_I, S_I), \quad (1)$$

where $S_I$ and $S_C$ are the incomplete and complete semantic maps. To learn the mapping function, the neural network system 100 is trained using a set of training data given by $$\text{Training dataset} = \{I_I^{(i)}, S_I^{(i)}, I_C^{(i)}, S_C^{(i)},\}_{i=1:N} \quad (2)$$

The learning task, then, is to match the two joint distributions $p(I_I, S_I, I_C, S_C)$ and $p(I_I, S_I, F(I_I, S_I))$. Matching the two joint distributions is the classical two-sample test problem in statistics that can be solved by minimizing the maximum mean discrepancy metric. In an embodiment, a variant of a conditional GAN framework is implemented to achieve the task. The variant is based on the conditional GAN framework, where the input is the high-resolution segmentation map and the output is the high-resolution image. The framework is modified so that the input is an incomplete image/segmentation map pair, while the output is a complete image/segmentation map pair.

For a training dataset used for supervised training, training pairs include an incomplete image and a corresponding ground truth (target) complete image. In an embodiment, the incomplete images are low resolution images and the complete images are corresponding ground truth (target) high resolution images. In an embodiment, incomplete input pairs are generated by removing data from complete image/semantic map pairs. For example, low resolution input images are generated by downscaling 256×128 pixel high resolution output images with bicubic interpolation to 16×8 pixels and then upscaling the downscaled image with bicubic interpolation to produce a 256×128 blurred input image. For example, low resolution semantic maps are generated by converting a high resolution 256×128 pixel semantic label map to probability values for each label class (a probability map). In an embodiment, the high resolution semantic map is converted to a parameterized volume (e.g., cube), where a depth of the cube equals the number of labels and each voxel of the cube is a semantic probability value of zero or one. The probability cube is downscaled with bicubic interpolation to 16×8 pixels, then the downscaled probability cube is upscaled with bicubic interpolation to produce a 256×128 probability cube, and the upscaled probability cube is converted to the low resolution semantic map. Converting the probability cube to the semantic map means that each pixel in the low-resolution semantic map has a specific semantic label rather than having a probability value over the semantic labels.

When the corresponding complete images are missing for a subset of incomplete images in the training dataset, a semi-supervised learning approach may be used to train the neural network system 100. Therefore, the neural network system 100 may be simultaneously trained using both supervised and unsupervised learning.

Ubertranslation creates an image containing regions that are not observed in the input image. Compared to uberzoom, the mapping function F for ubertranslation will learn to expand views outside the given field of view of an input image. Therefore, the translation task can be interpreted as learning to extrapolate, consisting of generating a complete image $I_C$ and a complete semantic map $S_C$, from incomplete image $I_I$ and incomplete semantic map $S_I$. In summary, the basic mapping needed for hallucinating image content for translation is also $I_C, S_C = F(I_I, S_I)$. Therefore, the neural network system 100 may be trained to perform hallucination for uberzoom applications using a different training dataset that is used for training the neural network system 100 for ubertranslation applications.

Figure 2A:
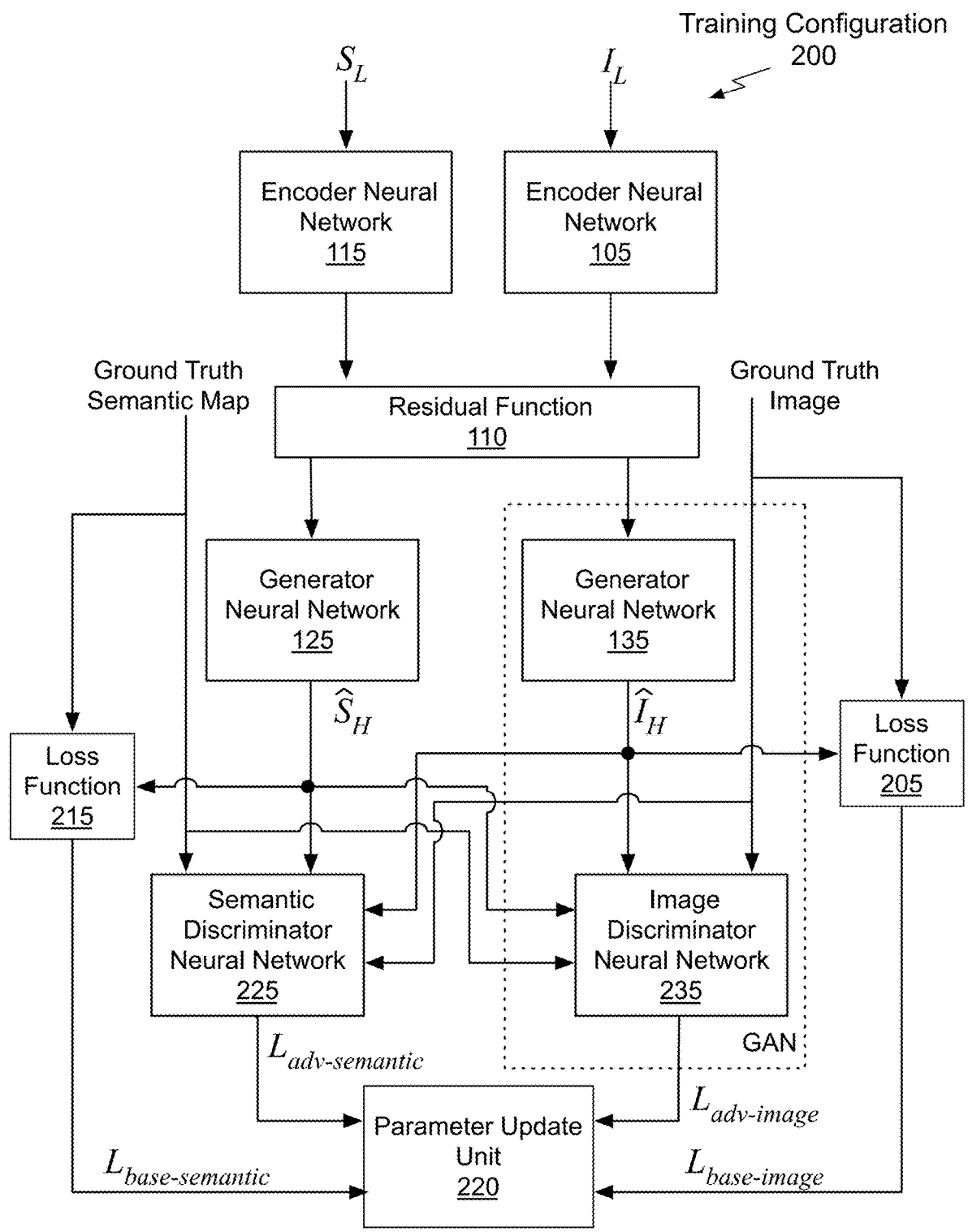
FIG. 2A illustrates a block diagram of a training configuration for the neural network system of FIG. 1B, in accordance with an embodiment.

FIG. 2A illustrates a block diagram of a training configuration 200 for the neural network system 100 of FIG. 1B, in accordance with an embodiment. In addition to the neural network system 100, the training configuration 200 includes semantic discriminator neural network 225, image discriminator neural network 235, loss functions 215 and 205, and a parameter update unit 220. The combination of the generator neural network 135 and the image discriminator neural network 235 form a GAN. The combination of the generator neural network 125 and the semantic discriminator neural network 225 form a second GAN.

A first base loss function is defined for reducing differences between the complete semantic map output by the generator neural network 125 the ground truth semantic map. The loss function 215 receives the complete semantic map output by the generator neural network 125 and a ground truth semantic map and computes a cross-entropy loss value for the complete semantic map.

$$L_{base-semantic}(G) = E_{(I_I, S, I_C)} - \frac{1}{K}\sum_{i=1}^{K} S_{GT}^{i} \log[G(I_I, S_I)]_{semantic}^{i},$$

where G is the generator neural network 125, E is the encoder neural network 115, $[G(I_I, S_I)]_{semantic}$ is the output high-resolution semantic map, $I_I$ is the incomplete input image, $S_I$ is the incomplete input semantic map, K is the number of semantic labels, and $S_{GT}^{i}$ is the ground truth high-resolution semantic map for the semantic label i.

A second base loss function is defined for reducing differences between the complete image output by the generator neural network 135 the ground truth image. The loss function 205 receives the complete image output by the generator neural network 135 and a ground truth image and computes a perceptual loss value for the complete output image.

$$L_{base-image}(G) = E_{(I_I, S, I_C)} \Sigma_{i=1}^{N} \|\Phi^{(i)}([G(I_I, S_I)]_{image}\|_1,$$

where G is the generator neural network 135, E is the encoder neural network 105, $[G(I_I, S_I)]_{image}$ is the output high-resolution image, N is the number of layers in a neural network for computing the loss function.

The semantic discriminator neural network 225 is an adversarial discriminator that receives the complete semantic map output by the generator neural network 125 and a ground truth semantic map. The semantic discriminator neural network 225 also receives the complete image output by the generator neural network 135 and a ground truth image, and computes a conditional adversarial loss. The semantic discriminator neural network 225 may compute the following condition adversarial loss function to ensure that the complete semantic map is plausible.

$$L_{adv-semantic}(G, D_{semantic}) = E_{(I_{GT}, S_{GT})}[\log D_{semantic}(I_{GT}, S_{GT})] + E_{(I_I, S_I, I_{GT})}[\log(1 - D_{semantic}(I_{GT}, [G(I_I, S_I)]_{semantic}))],$$

where $D_{semantic}$ is the semantic discriminator neural network 235.

The image discriminator neural network 235 is an adversarial discriminator that receives the complete image output by the generator neural network 135 and a ground truth image. The image discriminator neural network 235 also receives the complete semantic map output by the generator neural network 125 and a ground truth semantic map and computes a conditional adversarial loss. The image discriminator neural network 235 may compute the following condition adversarial loss function to ensure that the complete image is plausible.

$$L_{adv-image}(G, D_{image}) = E_{(I_{GT}, S_{GT})}[\log D_{image}(S_{GT}, I_{GT})] + E_{(I_I, S_I, I_{GT})}[\log(1 - D_{image}(S_{GT}, [G(I_I, S_I)]_{image}))],$$

where $D_{image}$ is the image discriminator neural network 225.

Two other loss values, specifically, discriminator activation loss or feature matching loss values may be computed by the semantic discriminator neural network 225 and the image discriminator neural network 235 to further improve the performance.

$$L_{FM-image}(G, D_{image}) =$$
$$+ E_{(I_I, S_I, I_{GT}, S_{GT})} \sum_{i=1}^{T} \|D^i_{image}(S_{GT}, I_{GT}) - D^i_{image}(S_{GT}, [G(I_I, S_I)]_{image})\|_1$$

and $$L_{FM-semantic}(G, D_{semantic}) = E_{(I_I, S_I, I_{GT}, S_{GT})}$$
$$\sum_{i=1}^{T} \|D^i_{semantic}(I_{GT}, S_{GT}) - D^i_{semantic}(I_{GT}, [G(I_I, S_I)]_{semantic})\|_1,$$

where $D^i$ is activation of the layer i from the discriminator neural network 225 or 235 and T is the number of layers in the discriminator neural networks 225 and 235.

The parameter update unit 220 provides updated layer parameters (e.g., weights) for the encoder neural network 115, the encoder neural network 105, the residual function 110, the generator neural network 125, and the generator neural network 135 based on the loss values. In an embodiment, the parameter update unit 220 updates the parameters to minimize the losses according to the following optimization formula including six loss functions:

$$\min_G \{L_{base-image}(G) + L_{base-semantic}(G) +$$
$$\max_{D_{image}} (L_{adv-image}(G, D_{image}) + L_{FM-image}(G, D_{image})) +$$
$$\max_{D_{semantic}} (L_{adv-semantic}(G, D_{semantic}) + L_{FM-semantic}(G, D_{semantic}))\}.$$

Figure 2B:
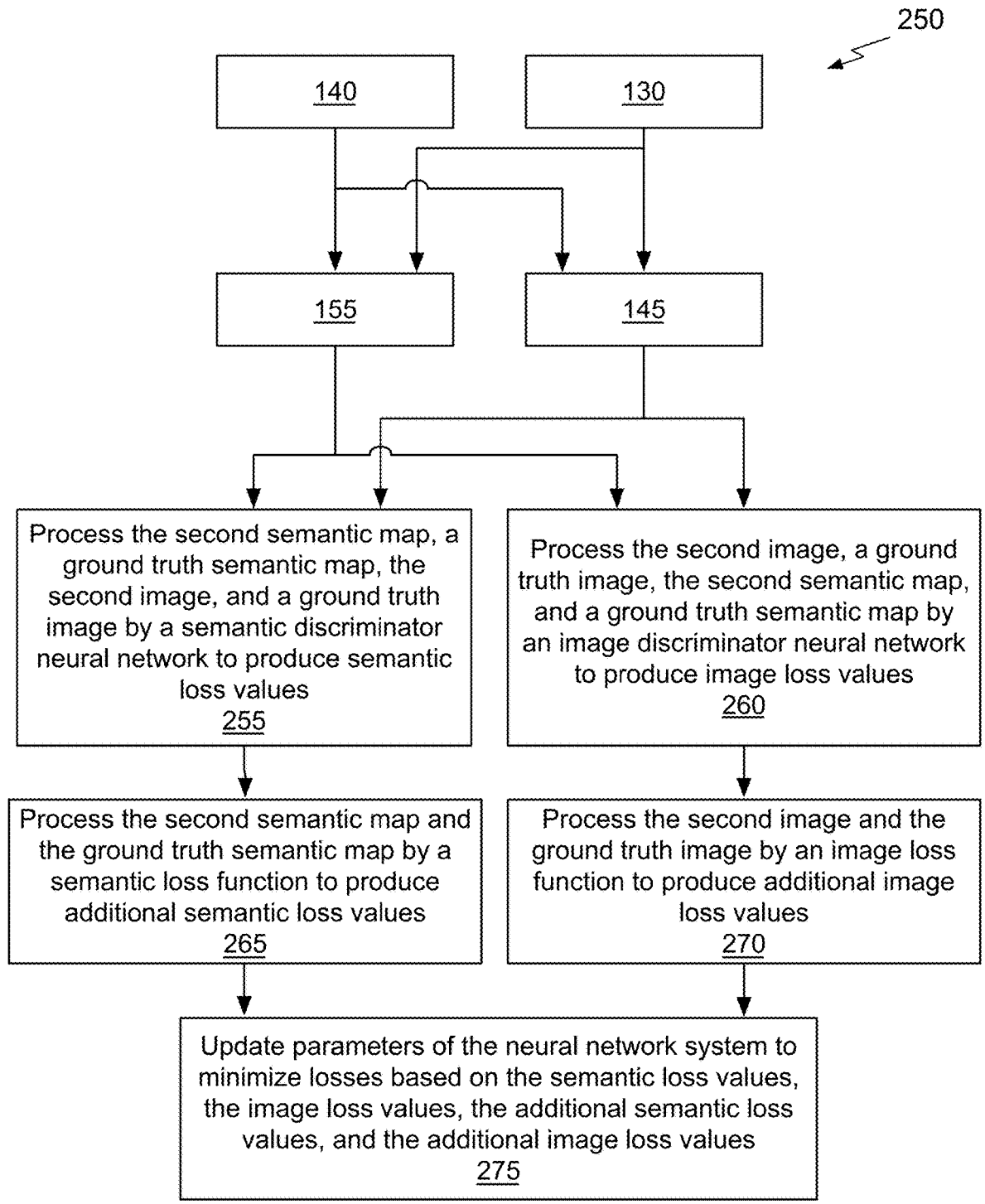
FIG. 2B illustrates a flowchart of a method for training the neural network system of FIG. 1B, in accordance with an embodiment.

FIG. 2B illustrates a flowchart of a method 250 for training the neural network system 100 of FIG. 1B, in accordance with an embodiment. Although method 250 is described in the context of a processing unit, the method 250 may also be performed by a program, custom circuitry, or by a combination of custom circuitry and a program. For example, the method 250 may be executed by a GPU (graphics processing unit), CPU (central processing unit), or any processor capable of implementing training configuration for a neural network model, such as the neural network system 100. Furthermore, persons of ordinary skill in the art will understand that any system that performs method 250 is within the scope and spirit of embodiments of the present disclosure.

Steps 130, 140, 145, and 155 are completed as previously described in conjunction with FIGS. 1C and 1D. At step 255, the second semantic map, the ground truth semantic map, the second image, and a ground truth image are processed by the semantic discriminator neural network 225 to produce semantic loss values. In an embodiment, the semantic loss values are computed as $L_{adv-semantic}(G, D_{semantic})$ and/or $L_{FM-semantic}(G, D_{semantic})$.

At step 260, the second image, the ground truth image, the second semantic map, and a ground truth semantic map are processed by the image discriminator neural network 235 to produce image loss values. In an embodiment, the image loss values are computed as $L_{adv-image}(G, D_{image})$ and/or $L_{FM-image}(G, D_{image})$.

At step 265, the loss function 215 processes the second semantic map and the ground truth semantic map to produce additional semantic loss values. In an embodiment, the additional semantic loss values are computed as $L_{base-semantic}(G)$. At step 270, the loss function 205 processes the second image and the ground truth image to produce additional image loss values. In an embodiment, the additional image loss values are computed as $L_{base-image}(G)$.

At step 275, the parameter update unit 220 updates the parameters of the neural network system 100 to minimize losses based on the semantic image loss values, the additional semantic loss values, the image loss values, and the additional image loss values.

After training, the neural network system 100 may be deployed to hallucinate image content for the applications of zooming in, camera motion, and/or creating infinite content, where the temporal consistency of the output image sequence produces a realistic or plausible result. For the application of zooming in, temporal consistency may be achieved by generating intermediate images. For example, instead of generating a high resolution image corresponding to a 16× zoom, a 2× zoom may be generated iteratively (4 times), using the output of the previous iteration as the input to the neural network system 100 for the next iteration. In another example, a user may provide multiple input images as keyframes to improve temporal consistency. For example, the keyframes for a sequence of images may be downsampled and intervening frames may be replaced with the downsampled data from the keyframes to hallucinate image data for at least one intervening image in the sequence of images. In addition to helping create more consistent image sequences, accepting multiple input images to generate the hallucinated content offers more control to the user.

In sum, the neural network system 100 enables the creation of a sequence of images by hallucinating content for one or more input images whose resolution is too low (zoom) or that is outside of the field of view of the original camera (i.e., simulate a camera moving laterally or rotating). The output sequence of complete images can then be a series of images forming a short video sequence, or a set of alternative versions of the input image in which the content varies through hallucination.

Hallucinating image content may also be used to generate street views (looking at a vanishing point), producing video sequences that are spatio-temporally consistent. The video sequences may have a varying or even infinite length from one or more low quality images and one or more corresponding low quality semantic maps. In an embodiment, a video sequence is similar street scenes for augmenting a training dataset needed for machine learning and computer vision tasks. Importantly, various appearances of instances in a scene may be hallucinated from a single input image and corresponding semantic map, easily augmenting training data for scene or object recognition tasks.

Parallel Processing Architecture

Figure 3:
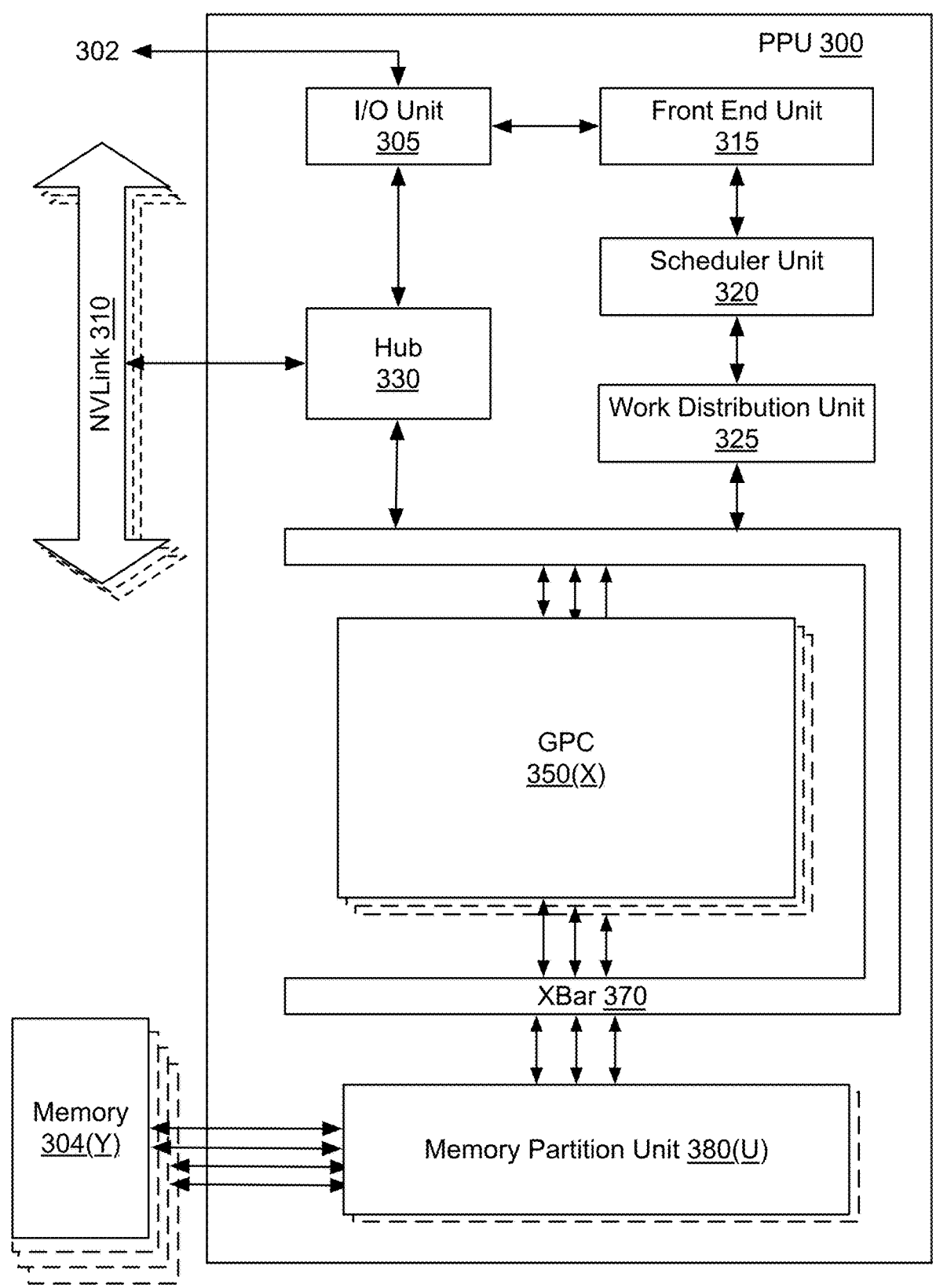
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
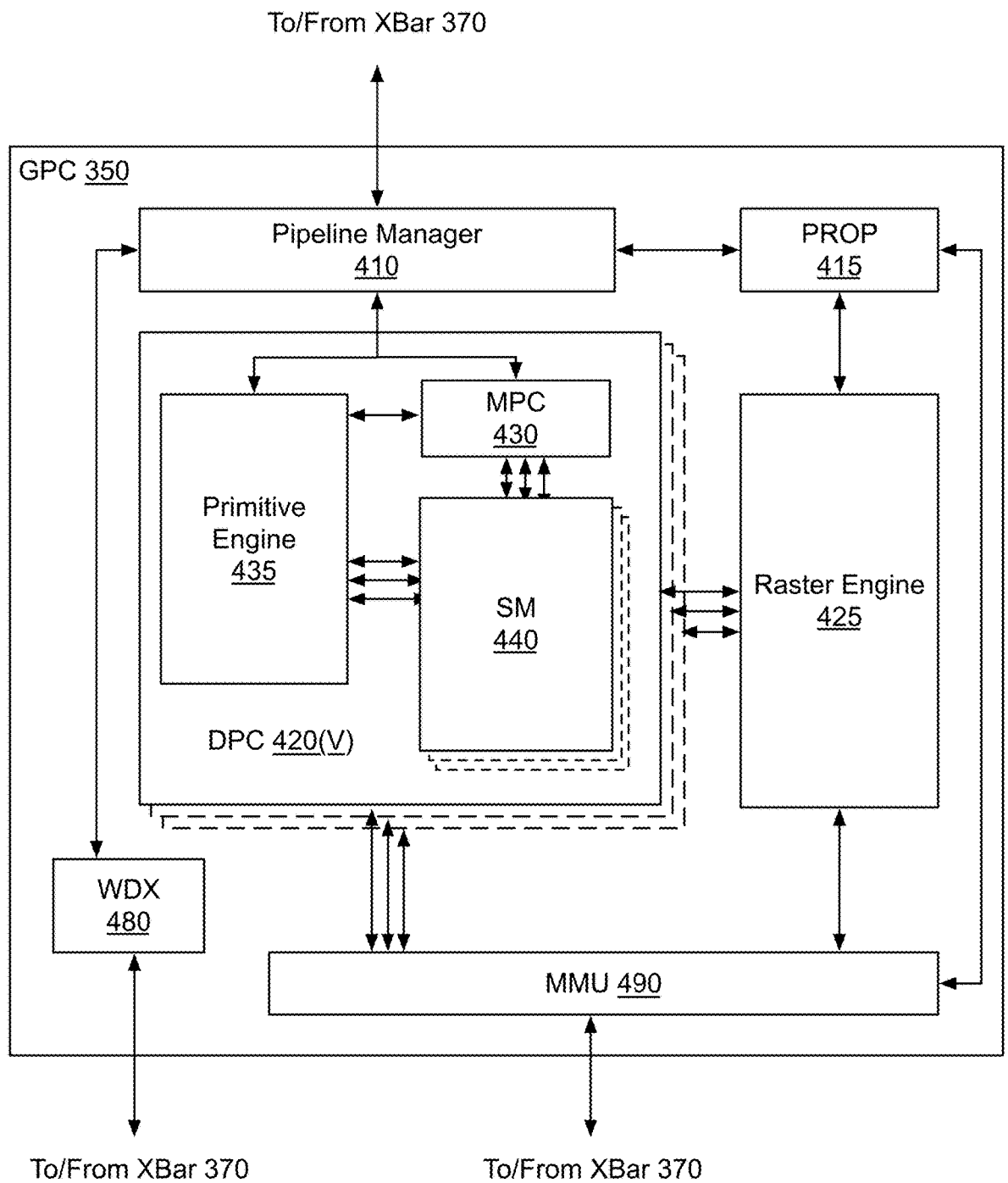
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
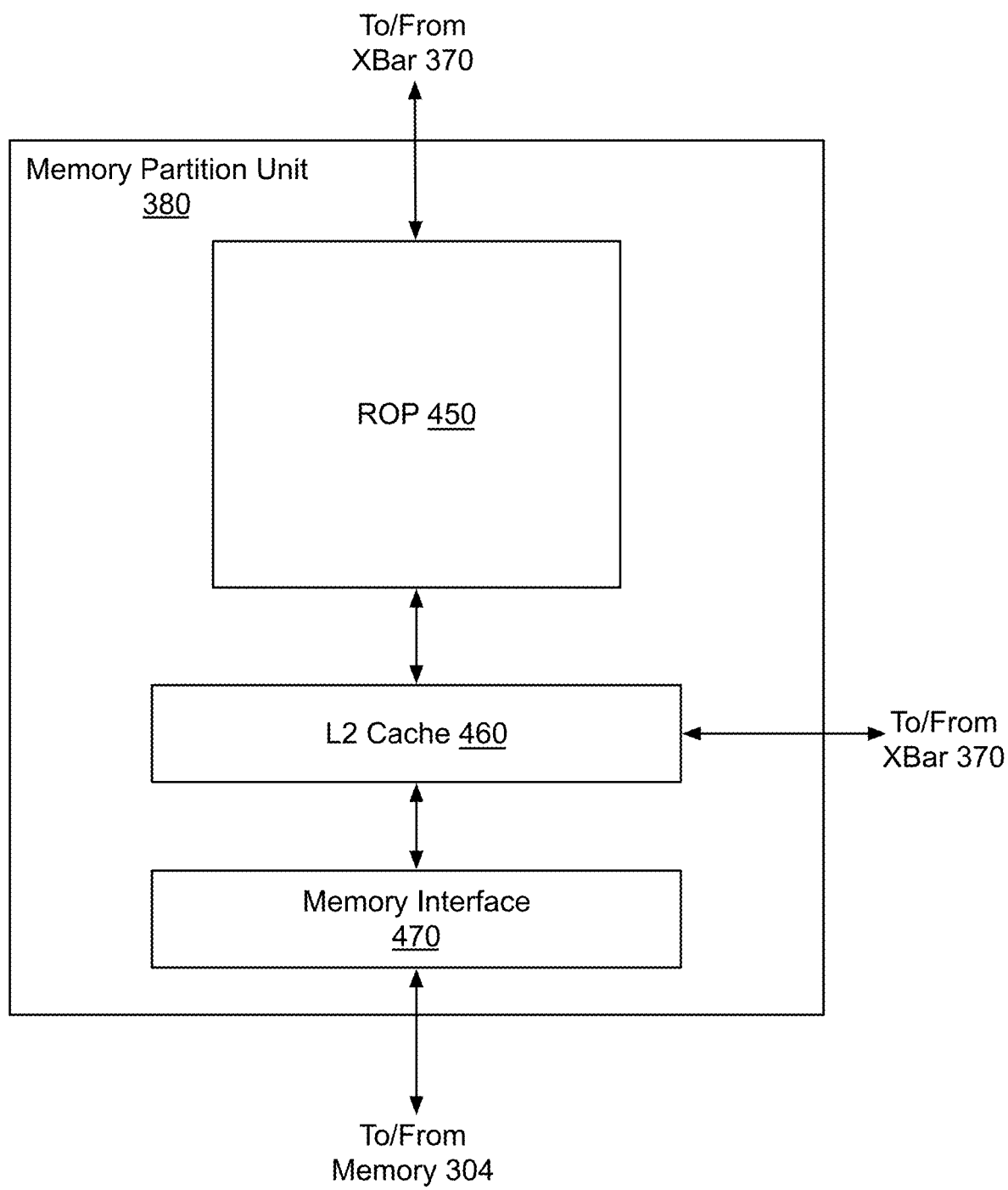
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
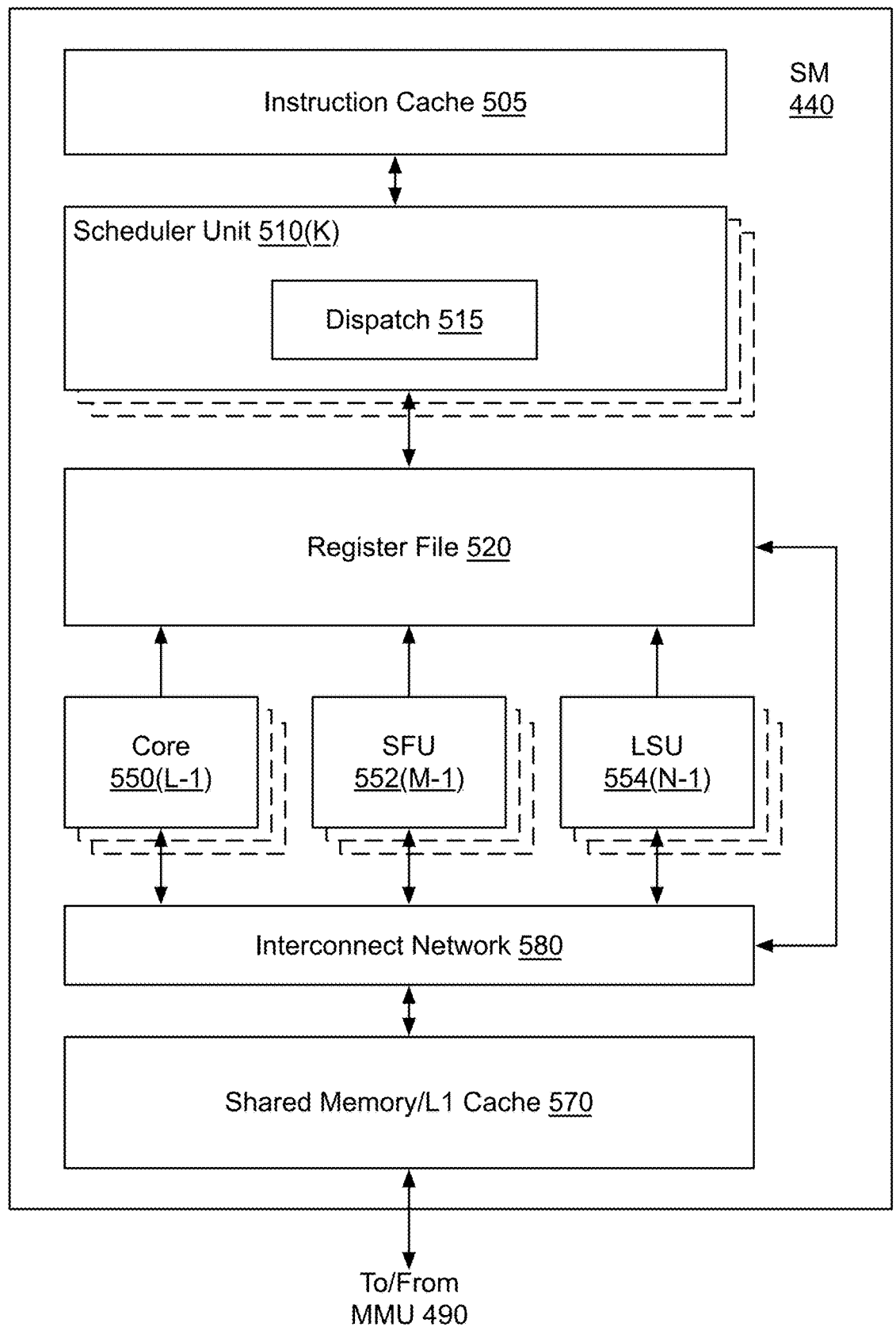
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
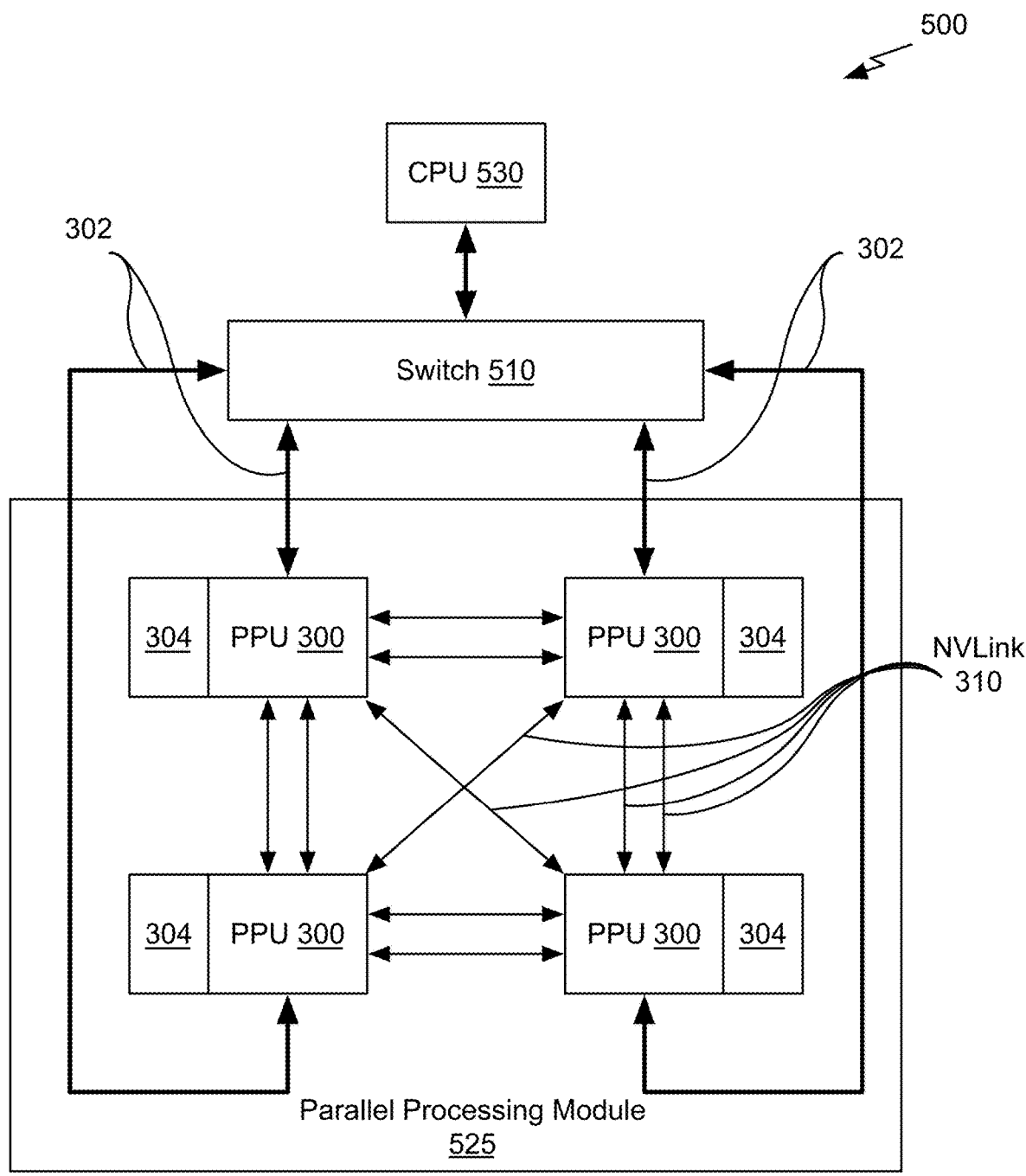
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 120, 150, and 250 shown in FIGS. 1C, 1D, and/or 2B, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
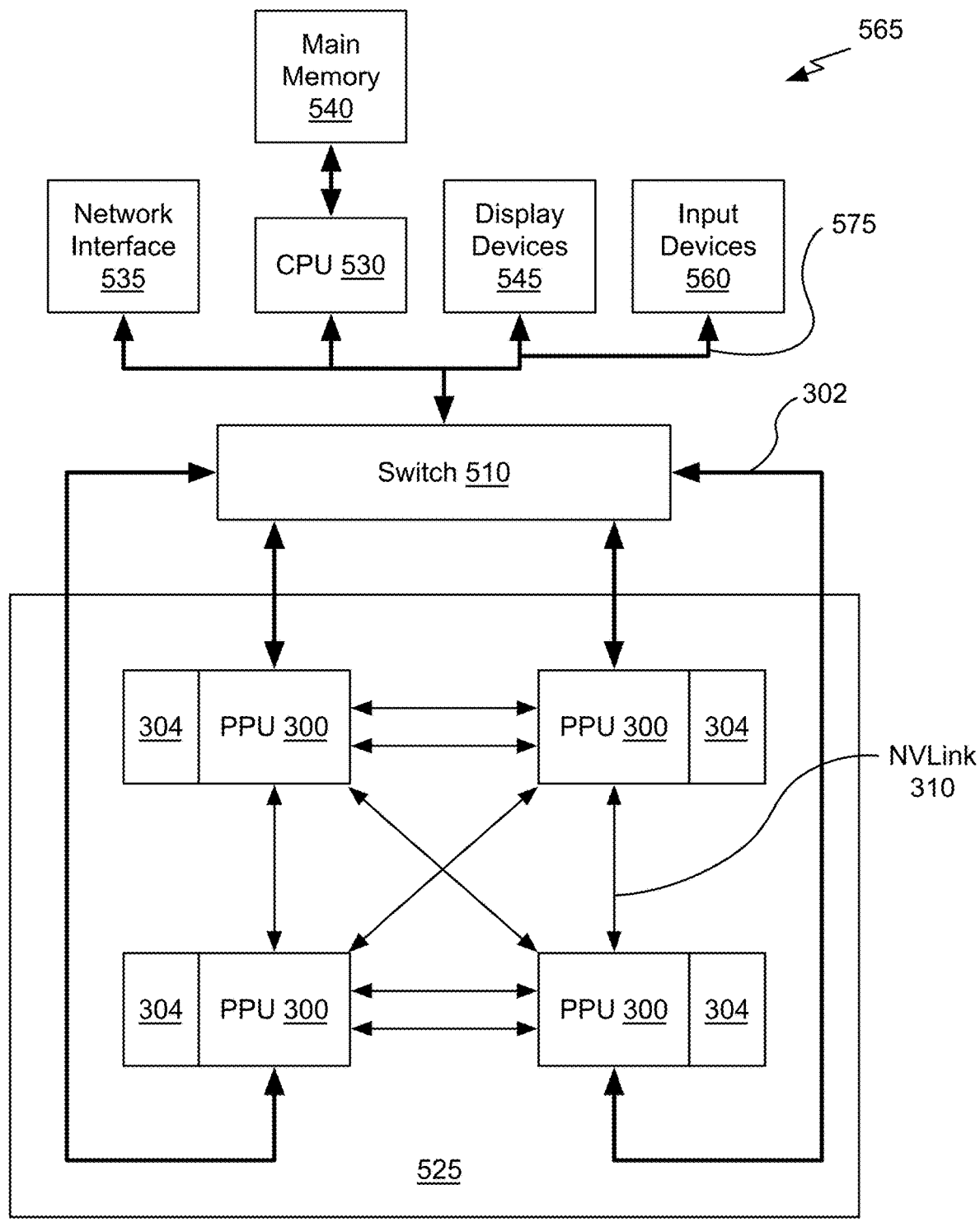
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 120, 150, and 250 shown in FIGS. 1C, 1D, and/or 2B, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
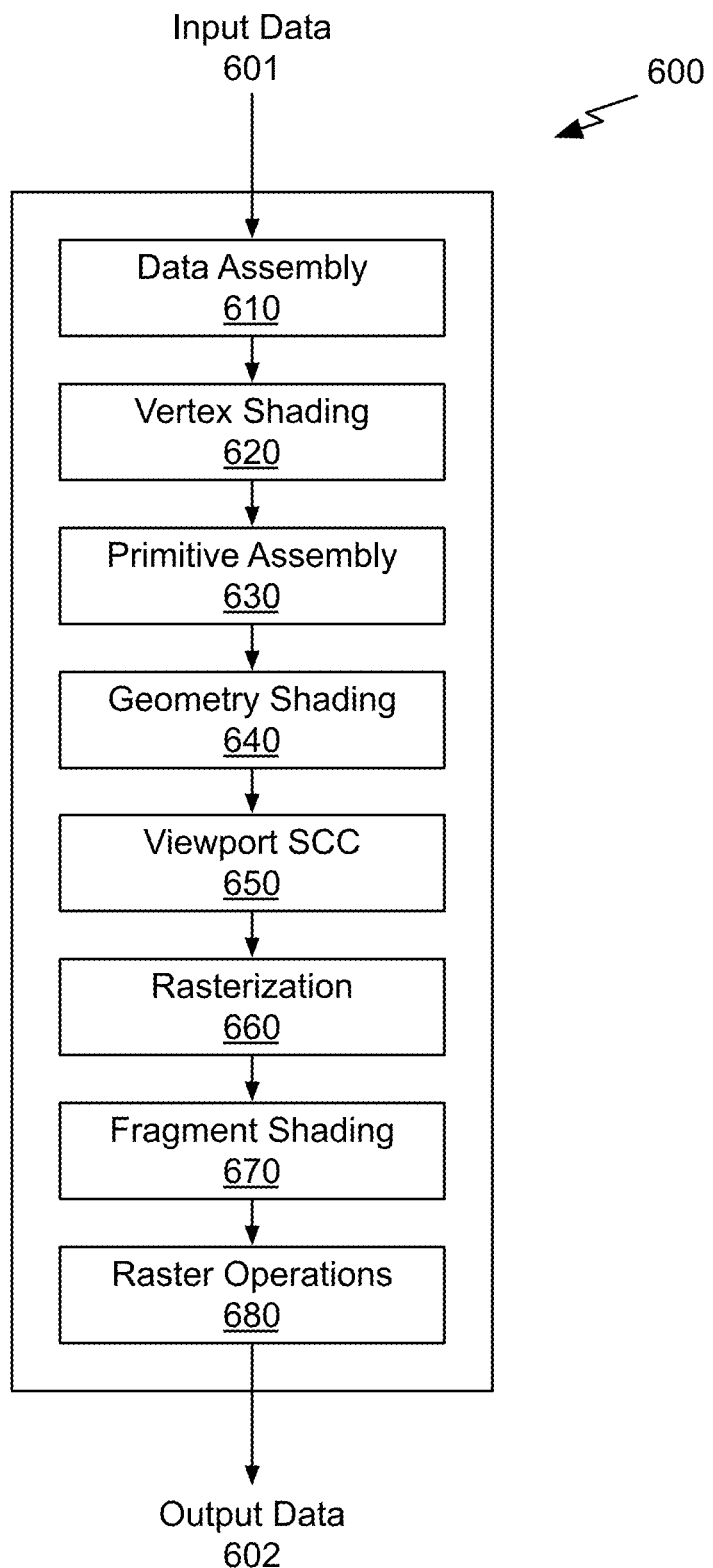
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:
1. A computer-implemented method, comprising:
    receiving, by a neural network model, a first image missing a portion of image data;

receiving by the neural network model, a first semantic map corresponding to the first image and missing a portion of semantic data;

processing the first image and the first semantic map, by the neural network model, to produce a second image including hallucinated image data representing a complete version of the first image and a second semantic map including hallucinated semantic data corresponding to the second image, wherein the second semantic map is a high resolution semantic map and the first semantic map is a low resolution semantic map.

2. The computer-implemented method of claim 1, further comprising training the neural network model using a semantic discriminator configured to evaluate the second semantic map based on a ground truth image corresponding to the complete version of the first image.

3. The computer-implemented method of claim 1, wherein the second image is a high resolution image and the first image is a low resolution image and further comprising:
modifying the second image to generate a second low resolution image;
modifying the second semantic map to generate a second low resolution semantic map; and
processing the second low resolution image and the second low resolution semantic map, by the neural network model, to generate an additional high resolution image that is different compared with the second image.

4. The computer-implemented method of claim 1, wherein the second image is a high resolution image and the first image is a low resolution image and further comprising:
extracting a first portion from the second image to generate a low resolution image for the first portion;
extracting a second portion from the second semantic map to generate a low resolution semantic map for the second portion, wherein the second portion corresponds to the first portion; and
processing the low resolution image for the first portion and the low resolution semantic map for the second portion by the neural network model to generate a second high resolution image.

5. The computer-implemented method of claim 4, wherein the second image and the second high resolution image are included in a sequence of images that, when displayed sequentially on a display device, provide a zoom effect from the second image to the first portion of the high resolution image displayed as the second high resolution image.

6. The computer-implemented method of claim 1, further comprising training the neural network model using an image discriminator configured to evaluate the second image based on a ground truth semantic map corresponding to a complete version of the first image.

7. The computer-implemented method of claim 1, further comprising:
receiving a keyframe image; and
generating at least one additional image in a sequence of images between the second image and the keyframe image.

8. The computer-implemented method of claim 1, further comprising processing the first image and the first semantic map, by the neural network model, to produce a third image including additional hallucinated image data representing a complete version of the first image, wherein the third image is different compared with the second image.

9. The computer-implemented method of claim 1, wherein the hallucinated image data is outside of a field-of-view associated with the first image.

10. A computer-implemented method, comprising:
receiving, by a neural network model, a first image missing a portion of image data;
receiving by the neural network model, a first semantic map corresponding to the first image and missing a portion of semantic data; and
processing the first image and the first semantic map, by the neural network model, to produce a second image including hallucinated image data representing a complete version of the first image, wherein the second image is a high resolution image and the first image is a low resolution image.

11. The computer-implemented method of claim 10, further comprising training the neural network model using a semantic discriminator configured to evaluate the second semantic map based on a ground truth image corresponding to the complete version of the first image.

12. The computer-implemented method of claim 10, further comprising processing the first image and the first semantic map to produce a third image including additional hallucinated image data representing a complete version of the first image, wherein the third image is different compared with the second image.

13. The computer-implemented method of claim 10, wherein the hallucinated image data is outside of a field-of-view associated with the first image.

14. The computer-implemented method of claim 10, wherein the hallucinated image data improvises the missing portion of the image data.

15. A computer-implemented method, comprising:
training the neural network model using a training data set that includes pairs of low resolution images and low resolution semantic maps associated with ground truth pairs of high resolution images and high resolution semantic maps;
receiving, by the neural network model, a first image missing a portion of image data;
receiving by the neural network model, a first semantic map corresponding to the first image and missing a portion of semantic data; and
processing the first image and the first semantic map, by the neural network model, to produce a second image including hallucinated image data representing a complete version of the first image.

16. The computer-implemented method of claim 15, further comprising processing the first image and the first semantic map to produce a third image including additional hallucinated image data representing a complete version of the first image, wherein the third image is different compared with the second image.

17. The computer-implemented method of claim 15, wherein the hallucinated image data is outside of a field-of-view associated with the first image.

18. A system, comprising:
a processor configured to implement a neural network model that is configured to:
receive a first image missing a portion of image data;
receive a first semantic map corresponding to the first image and missing a portion of semantic data; and
process the first image and the first semantic map to produce a second image including hallucinated image data representing a complete version of the first image and a second semantic map including hallucinated semantic data corresponding to the second image, wherein the second semantic map is a high resolution semantic map and the first semantic map is a low resolution semantic map.

19. The system of claim 18, wherein the neural network model is further configured to process the first image and the first semantic map to produce a third image including additional hallucinated image data representing a complete version of the first image, wherein the third image is different compared with the second image.

20. The system of claim 18, wherein the hallucinated image data is outside of a field-of-view associated with the first image.

21. A system, comprising:
a processor configured to implement a neural network model that is configured to:
receive a first image missing a portion of image data;
receive a first semantic map corresponding to the first image and missing a portion of semantic data; and
process the first image and the first semantic map to produce a second image including hallucinated image data representing a complete version of the first image, wherein the second image is a high resolution image and the first image is a low resolution image.

22. The system of claim 21, wherein the neural network model is further configured to process the first image and the first semantic map to produce a second semantic map including hallucinated semantic data corresponding to the second image.

23. The system of claim 21, wherein the neural network model is further configured to process the first image and the first semantic map to produce a third image including additional hallucinated image data representing a complete version of the first image, wherein the third image is different compared with the second image.

24. The system of claim 21, wherein the hallucinated image data is outside of a field-of-view associated with the first image.

25. A system, comprising:
a processor configured to implement a neural network model that is configured to:
receive a first image missing a portion of image data;
receive a first semantic map corresponding to the first image and missing a portion of semantic data; and
process the first image and the first semantic map to produce a second image including hallucinated image data representing a complete version of the first image, wherein the neural network model is trained using a training data set that includes pairs of low resolution images and low resolution semantic maps associated with ground truth pairs of high resolution images and high resolution semantic maps.

26. The system of claim 25, wherein the neural network model is further configured to process the first image and the first semantic map to produce a third image including additional hallucinated image data representing a complete version of the first image, wherein the third image is different compared with the second image.

27. The system of claim 25, wherein the hallucinated image data is outside of a field-of-view associated with the first image.

28. A non-transitory computer-readable media storing computer instructions that, when executed by one or more processors, cause the one or more processors to perform the steps of:
providing, to a neural network model, a first image missing a portion of image data;
providing to the neural network model, a first semantic map corresponding to the first image and missing a portion of semantic data; and
processing the first image and the first semantic map, by the neural network model, to produce a second image including hallucinated image data representing a complete version of the first image, wherein the second image is a high resolution image and the first image is a low resolution image.

29. A non-transitory computer-readable media storing computer instructions that, when executed by one or more processors, cause the one or more processors to perform the steps of:
providing, to a neural network model, a first image missing a portion of image data;
providing to the neural network model, a first semantic map corresponding to the first image and missing a portion of semantic data; and
processing the first image and the first semantic map, by the neural network model, to produce a second image including hallucinated image data representing a complete version of the first image, wherein the neural network model is trained using a training data set that includes pairs of low resolution images and low resolution semantic maps associated with ground truth pairs of high resolution images and high resolution semantic maps.

30. A non-transitory computer-readable media storing computer instructions that, when executed by one or more processors, cause the one or more processors to perform the steps of:
providing, to a neural network model, a first image missing a portion of image data;
providing to the neural network model, a first semantic map corresponding to the first image and missing a portion of semantic data; and
processing the first image and the first semantic map, by the neural network model, to produce a second image including hallucinated image data representing a complete version of the first image and a second semantic map including hallucinated semantic data corresponding to the second image, wherein the second semantic map is a high resolution semantic map and the first semantic map is a low resolution semantic map.

31. The non-transitory computer-readable media of claim 30, further comprising training the neural network model using a semantic discriminator configured to evaluate the second semantic map based on a ground truth image corresponding to the complete version of the first image.

* * * * *